United States Patent
Palencher et al.

[15] 3,705,351
[45] Dec. 5, 1972

[54] MOVING FRAME MEASURING DEVICE

[72] Inventors: Jacques Palencher; Michel Penard, both of Troyes, France

[73] Assignee: Societe dite: Lebocey Industrie, Troyes, France

[22] Filed: Jan. 25, 1971

[21] Appl. No.: 109,147

[52] U.S. Cl. .............................. 324/151 R, 324/154
[51] Int. Cl. .............................................. G01r 1/16
[58] Field of Search ........................... 324/151, 154

[56] References Cited
UNITED STATES PATENTS 1,782,519   11/1930   Sutton ................................. 324/151

FOREIGN PATENTS OR APPLICATIONS 982,499   1/1951   France ................................. 324/151

*Primary Examiner*—Alfred E. Smith
*Attorney*—McNenny, Farrington, Pearne & Gordon

[57] ABSTRACT

The invention relates to a moving frame measuring device comprising a fixed magnet creating a magnetic field in which a coil carrying an indicating pointer can move, the moving part consisting of a frame, with spindle locating holes, carrying a coil.

3 Claims, 3 Drawing Figures

MOVING FRAME MEASURING DEVICE

The invention relates to a moving frame measuring device comprising a fixed magnet creating a magnetic field in which a coil carrying the indication pointer of the measuring device can move.

The support frame of the moving part has spindle-locating holes in it and is mounted on a fixed spindle so that the frame can rotate on the spindle by means of the said spindle-locating holes.

Another feature of the invention is that at least one of the parts in which the spindle-locating holes are situated is fixed on a resilient tongue carried by the support frame.

The invention is illustrated by some nonlimiting examples in the accompanying drawings in which.

Figure 1:
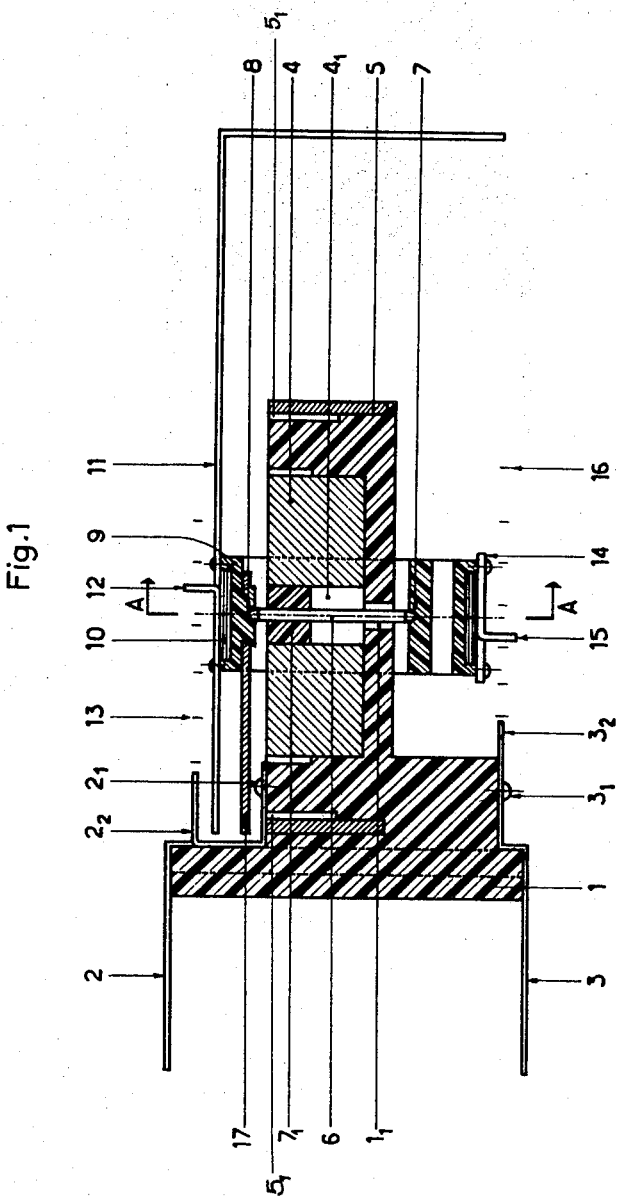
FIG. 1 shows a cross-section of the measuring device in accordance with the invention.
Figure 2:
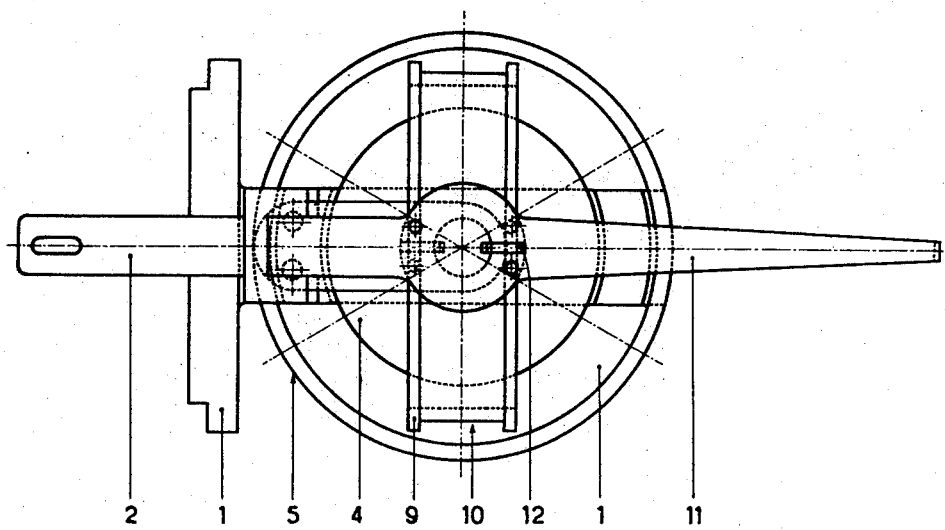
FIG. 2 shows a plan of the device.
Figure 3:
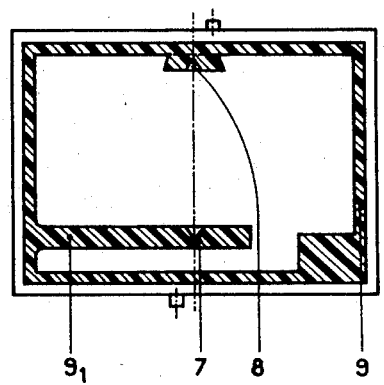
FIG. 3 shows a section of the mobile frame support as it appears in the plane indicated by A—A in FIG. 1.

The device illustrated by these figures comprises a chassis 1, preferably made of moulded plastic material on which terminals 2 and 3 are fixed at $2_1$ and $3_1$ for inputting the electric current that is to be measured by the device.

Inside the chassis 1 is a space into which a permanent magnet 4 is fitted.

In addition, the chassis 1 also provides a housing for a cylindrical metal part 5 surrounding at spaced intervals $5_1$ the permanent magnet 4.

In the center of the magnet is a hollow $4_1$ inside which the spindle 6 is held by means of a retaining ring $7_1$ made of plastic material. This makes it possible to position the moving part of the device simply and accurately.

The spindle 6, the ends of which act as pivot points, passes through the orifice $1_1$ and lodges in the spindle-locating holes 7 and 8 situated in the support frame 9, preferably made of plastic material.

The frame support 9 holds the coil 10, the frame support 9 and the coil 10 constituting the moving frame part of the device.

Fixed on the support frame 9 is the indicating pointer 11 which is provided with a bracket 12. To this bracket is attached one of the ends of the spiral return spring 13 fixed to the bracket $2_2$ on the input tongue or terminal 2.

Likewise a component 14 provided with a tongue 15 is fixed onto that part of the frame 9 which is opposite to the part of the said frame on which the indicating pointer 11 is located. The tongue 15 holds the inner end of the second spiral spring 16 of which the outer end is fixed to the end $3_2$ of the input tongue or terminal 3.

In addition, the two ends of the coil are fixed, for example, by soldering, on one hand to the pointer 11, and on the other, to the component 14, so that the current to be measured enters the coil by means of the tongues 2 and 3 and by means of the return springs 13 and 16.

The lower spindle locating hole 7 is made in a resilient tongue $9_1$ of the frame 9. This enables the shocks to which the measuring device may be subjected to be damped appreciably, thus preventing damage to the moving parts of the device.

The tongue $9_1$ should be preferably made as an integral part of the support frame 9. This is particularly desirable when the support frame is made of a plastic material. However, the tongue $9_1$ may also be made of a material different from that of the frame; for example, it can be made of metal and inserted into a frame made of a plastic material.

In addition a tongue 17 is fixed on frame 9 at a point opposite the longest part of the pointer 11 with reference to the spindle 6 in order to keep the moving part of the device in balance.

It will be evident that the invention is not limited to the embodiments described and illustrated herein above and that on the basis of these other forms and embodiments can be envisaged within the scope of this invention.

What is claimed is:

1. A moving frame measuring device comprising a fixed magnet creating a magnetic field about a moving frame carrying an indicating pointer, said moving frame consisting of a support frame carrying a coil, said support frame comprising pivoting brackets receiving the ends of a fixed spindle axially disposed within said magnetic device characterized by the support frame including a tongue perpendicularly disposed with respect to said fixed spindle, one end of said spindle being disposed upon the inside wall of said frame, said tongue comprising one of the pivoting brackets of the frame of the spindle.

2. A moving frame measuring device comprising a cylindrical permanent magnet coaxially, longitudinally, fixedly disposed within a non-magnetic chassis; a fixed spindle coaxially, longitudinally disposed within said permanent magnet; a coil carried on a generally rectangular frame adapted to be rotatably disposed upon said fixed spindle, said frame including a tongue projecting inwardly from an inner wall of one side of said frame, one end of said tongue adapted to be pivotally disposed upon the upper end of said fixed spindle, the other end of said spindle being pivotally disposed within the inner wall of the bottom of said frame; an indicating pointer fixedly disposed upon the upper surface of said frame, above said coil, said pointer including means adapted to fixedly engage one end of an upper coil-spring, the other end of said upper coil-spring being attached to an upper terminal in current-conducting relationship with said coil; means fixedly disposed upon the lower surface of said frame including means adapted to fixedly engage one end of a lower coil-spring, the other end of said lower coil-spring being fixedly attached to a lower terminal in current-conducting relationship to said coil so as to obtain a deflection of said pointer when current is passed through said coil.

3. The device of claim 2 wherein said frame and tongue are molded as a unit piece from a synthetic resinous metal.

* * * * *